(12) United States Patent
Wu

(10) Patent No.: US 9,310,529 B2
(45) Date of Patent: Apr. 12, 2016

(54) RETARDATION FILM, METHOD FOR PRODUCING THE SAME AND DISPLAY APPARATUS

(71) Applicant: BOE TECHNOLOGY GROUP CO., LTD., Beijing (CN)

(72) Inventor: Kun Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/403,697

(22) PCT Filed: Mar. 31, 2014

(86) PCT No.: PCT/CN2014/074394
§ 371 (c)(1),
(2) Date: Nov. 25, 2014

(87) PCT Pub. No.: WO2015/039421
PCT Pub. Date: Mar. 26, 2015

(65) Prior Publication Data
US 2015/0301232 A1    Oct. 22, 2015

(30) Foreign Application Priority Data

Sep. 17, 2013   (CN) .......................... 2013 1 0425654

(51) Int. Cl.
*G02B 5/30* (2006.01)
*G02B 27/26* (2006.01)
(Continued)

(52) U.S. Cl.
CPC .. *G02B 1/14* (2015.01); *G02B 1/12* (2013.01); *G02B 5/30* (2013.01); *G02B 5/3083* (2013.01); *G02B 27/26* (2013.01); *G02F 1/13363* (2013.01); *G02F 2001/133631* (2013.01)

(58) Field of Classification Search
CPC ........ G02B 1/14; G02B 5/3083; G02B 27/26; G02B 1/12
USPC ...................................... 359/489.07
See application file for complete search history.

(56) References Cited

U.S. PATENT DOCUMENTS

| 2009/0066888 A1* | 3/2009 | Kunai | .................... G02B 5/305 349/96 |
| 2012/0257145 A1* | 10/2012 | Lee | ...................... G02B 5/3016 349/75 |

(Continued)

FOREIGN PATENT DOCUMENTS

| CN | 101053862 A | 10/2007 |
| CN | 102169200 A | 8/2011 |

(Continued)

OTHER PUBLICATIONS

Office Action issued in Chinese application 201310425654.4 issued Apr. 1, 2015.

(Continued)

*Primary Examiner* — Frank Font
(74) *Attorney, Agent, or Firm* — Nath, Goldberg & Meyer; Joshua B. Goldberg

(57) ABSTRACT

The invention provides a retardation film, a method for producing the same and a display apparatus comprising the same. The retardation film comprises a phase retardation layer and a cured material layer formed by curing a curable material applied on the phase retardation layer, wherein the cured material layer is disposed on the light-emitting side of the phase retardation layer. In the retardation film of this invention, since the cured material layer is formed by curing the curable material applied on the phase retardation layer, the laminating equipment can be omitted and the equipment investment can thus be decreased, thereby lowering the production cost.

14 Claims, 5 Drawing Sheets

(51) Int. Cl.
*G02B 1/14* (2015.01)
*G02F 1/13363* (2006.01)
*G02B 1/12* (2006.01)

(56) References Cited

U.S. PATENT DOCUMENTS

| | | |
|---|---|---|
| 2012/0307168 A1 | 12/2012 | Dong et al. |
| 2013/0029087 A1* | 1/2013 | Hatanaka ............ C09D 133/062 428/98 |
| 2013/0083276 A1* | 4/2013 | Iwahashi ................. B41M 3/06 349/117 |
| 2013/0192491 A1* | 8/2013 | Nishiyama ............... C09D 4/00 106/287.15 |
| 2013/0286480 A1* | 10/2013 | Hirota ...................... G02B 1/08 359/492.01 |

FOREIGN PATENT DOCUMENTS

| | | |
|---|---|---|
| CN | 102681071 A | 9/2012 |
| CN | 102736159 A | 10/2012 |
| CN | 102893202 A | 1/2013 |
| CN | 102937728 A | 2/2013 |
| CN | 103605176 A | 2/2014 |
| CN | 203422490 U | 2/2014 |
| JP | 2013-20135 A | 1/2013 |
| JP | 2013020135 A | 1/2013 |
| JP | 2013-109219 A | 6/2013 |

OTHER PUBLICATIONS

International Search Result issued in international application PCT/CN2014/074394 mailed Jul. 4, 2014.
Search Report issued in International Application No. PCT/CN2014/074394, thirteen (13) pages.
Office action of Oct. 19, 2015 of Chinese counterpart application No. 201310425654.4 with English translation.

* cited by examiner

RETARDATION FILM, METHOD FOR PRODUCING THE SAME AND DISPLAY APPARATUS

This is a National Phase Application filed under 35 U.S.C. 371 as a national stage of PCT/CN2014/074394, filed Mar. 31, 2014, and claims priority benefit from Chinese Application No. 201310425654.4, filed Sep. 17, 2013, the content of each of which is hereby incorporated by reference in its entirety.

FIELD OF THE INVENTION

The present invention relates to the field of display technique, particularly to a retardation film, a method for producing the same and a display apparatus comprising the same.

BACKGROUND OF THE INVENTION

Recently, since stereoscopic (3D) displays become more popular with the development of display technique, various manufacturers have invested heavily in the stereoscopic display field and they are competing fiercely with each other. Currently, techniques of stereoscopic display with glasses are typically used among the stereoscopic display techniques, and the main techniques of stereoscopic display with glasses can be divided into shutter stereoscopic display technique and polarization stereoscopic display technique. For the shutter stereoscopic display technique, stereoscopic display is realized by increasing the refresh frequency of an image. Images with full high definition can be provided by the shutter stereoscopic display technique because there is no loss of image resolution. Moreover, no additional component needs to be added to the liquid crystal panel because only the refresh frequency needs to be increased; therefore the cost thereof is lower. However, the shutter stereoscopic display technique involves the following disadvantages: low brightness, heavy and expensive glasses which need to be charged and have flicker and crosstalk between images. For the polarization stereoscopic display technique, the original images are decomposed into two groups of images, i.e., the polarized light in the perpendicular direction and the polarized light in the horizontal direction by use of the principle of vibration direction of light. Since the left lens and right lens of the 3D glasses are made of polarized lenses with different polarization directions separately, two groups of images are individually received by the left eye and right eye of a human through the 3D glasses, and then synthesized into a stereoscopic image by the human brain. Currently, the circular polarization is conventionally used in the polarization stereoscopic display technique to realize stereoscopic display. Compared with the shutter stereoscopic display technique, the polarization stereoscopic display technique has the following advantages: the 3D glasses are simple in structure, low-cost, convenience for wearing, and does not need an electrical source; and the image brightness is higher than that of the shutter stereoscopic display technique, and the wearer does not feel dizzy due to flicker because there is no shutter disposed therein.

Because of the above advantages, the polarization stereoscopic display technique becomes currently the main technique in the stereoscopic display technique field. The polarization stereoscopic display technique can be realized by a stereoscopic display apparatus. FIG. 1 is a schematic view showing the structure of one stereoscopic display apparatus in the prior art. As shown in FIG. 1, the stereoscopic display apparatus may comprise: a liquid crystal display panel 1, polarizing films 2 and a phase retardation layer 3, wherein the polarizing films 2 are formed on the liquid crystal display panel 1 and the phase retardation layer 3 is formed on the polarizing film 2 that is disposed on the light-emitting side of the liquid crystal display panel. The phase retardation layer 3 can comprise: an alignment layer and a thermotropic liquid crystal layer disposed on the alignment layer, such as a liquid crystal layer formed by the reactive mesogen (hereinafter referred as "RM"). During the production of a stereoscopic display apparatus, the phase retardation layer 3 can be directly formed on the light-emitting side of the polarizing film 2, and during the formation of the phase retardation layer 3, it is necessary to perform an exposure process with ultraviolet rays (hereinafter referred as "UV") to the material for forming the phase retardation layer 3. During the UV exposure process, the alignment of the phase retardation layer 3 with the liquid crystal display panel 1 is realized by an exposure device, and has improved alignment accuracy compared with the alignment obtained by laminating. However, in the prior art, the phase retardation layer 3 formed on the light-emitting side of the polarizing film 2 is disposed at the outermost and the material for forming the phase retardation layer 3 does not have humidity resistance and scratch resistance, therefore the phase retardation layer 3 would lose the properties thereof gradually if no protection is provided, thereby causing the deterioration or failure of the stereoscopic display effect of the stereoscopic display apparatus.

A protection film 4 is generally formed on the phase retardation layer 3 to solve the above-mentioned problem, and the protection film 4 is usually a polyethylene terephthalate (PET) film or a cellulose triacetate (TAC) film. Since the protection film 4 is a preformed film, it is still necessary to laminate the preformed protection film 4 onto the phase retardation layer 3 by laminating equipment, and thereby both the equipment investment and the production cost are increased.

SUMMARY OF THE INVENTION

In order to solve the above-mentioned problem, the present invention provides a retardation film, a method for producing the same and a display apparatus comprising the same. The equipment investment can be decreased and thus the production cost can be lowered by carrying out the present invention.

In a first aspect, the present invention provides a retardation film comprising a phase retardation layer and a cured material layer formed by curing a curable material applied on the phase retardation layer.

Preferably, the curable material after being cured has hardness of equal to or greater than 2H, and light transmittance of equal to or greater than 90%.

Optionally, the curable material comprises an UV-curable material or a heat-curable material. The UV-curable material comprises UV glue which may be, for example, acrylic, unsaturated polyester, acrylic polyurethane, epoxy acrylate, polyester acrylate, polyether acrylate, and the like. The acrylic UV glue may be LOCTITE 3492, LOCTITE 3493 or LOCTITE 3494 (manufactured by Henkel Company).

The heat-curable material comprises an acrylic heat-curable resin, a melamine-alkyd heat-curable resin, a phenolic heat-curable resin, and the like. The acrylic heat-curable resin can be op2131D (manufactured by Momentive Company) or DBA2420 (manufactured by Dupont Company).

Optionally, the thickness of the cured material layer is in a range of 20 μm to 500 μm.

Optionally, the thickness of the cured material layer is in a range of 20 μm to 100 μm.

In a second aspect, the present invention provides a display apparatus comprising a display device and a retardation film disposed on the light-emitting side of the display device, wherein the retardation film comprises a phase retardation layer and a cured material layer formed by curing a curable material applied on the phase retardation layer.

In a third aspect, the present invention provides a method for producing a retardation film comprising:

Step 1, forming a phase retardation layer;

Step 2, applying a curable material on the phase retardation layer; and

Step 3, forming a cured material layer by curing the curable material using a curing process.

Optionally, the Step 2 comprises applying the curable material on the phase retardation layer by a spin-coating process, a slit-coating process, a wire-bar coating process or an ink-jet coating process.

Optionally, the curable material comprises an UV-curable material.

Optionally, the Step 3 comprises UV-curing the UV-curable material by a UV-curing process.

Optionally, the UV wavelength in the UV-curing process is in a range of 200 nm to 400 nm.

Optionally, the UV wavelength in the UV-curing process is 365 nm.

Optionally, the UV irradiation time in the UV-curing process is in a range of 2 s to 10 s.

Optionally, the curable material comprises a heat-curable material.

Preferably, the curing temperature of the heat-curable material is in a range of 50° C. to 200° C.

Optionally, the Step 3 comprises heat-curing the heat-curable material by a heat-curing process.

Optionally, the thickness of the cured material layer is in a range of 20 μm to 500 μm.

Optionally, the thickness of the cured material layer is in a range of 20 μm to 100 μm.

In the retardation film, the method for producing the same and the display apparatus comprising the same provided in this invention, the retardation film comprises the phase retardation layer and the cured material layer on the phase retardation layer, wherein the cured material layer is formed by curing the curable material applied on the phase retardation layer. The curing treatment can be performed utilizing the in-use device, therefore, compared with the prior art, the present invention can provide a decreased equipment investment and thus a lowered production cost since no additional laminating equipment is need.

DETAILED DESCRIPTION OF EMBODIMENTS

In order to make the person skilled in the art better understand the technical solution of the present invention, the retardation film, the method for producing the same and the display apparatus provided in the present invention will be described below in details with reference to the accompanying drawings. It should be understood that, the following embodiments are merely for explanation or description of the technical solution of the present invention and do not intend to limit the protection scope of the present invention.

Figure 1:
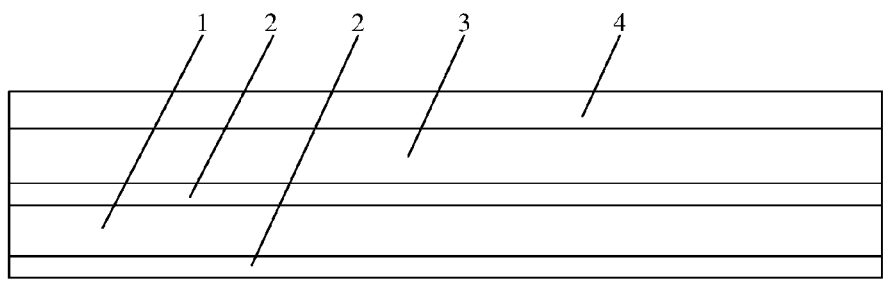
FIG. 1 is a schematic view showing the structure of one stereoscopic display apparatus in the prior art.
Figure 2:
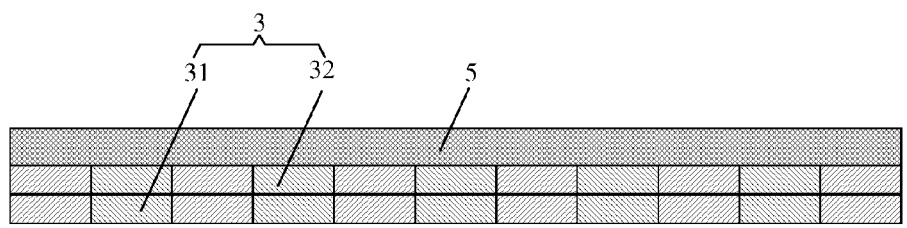
FIG. 2 is a schematic view showing the structure of a retardation film provided according to the first aspect of the present invention.

FIG. 2 is a schematic view showing the structure of a retardation film provided according to the first aspect of the present invention. As shown in FIG. 2, the retardation film comprises a phase retardation layer 3 and a cured material layer 5 formed by curing a curable material applied on the phase retardation layer 3, wherein the cured material layer 5 is disposed on the light-emitting side of the phase retardation layer 3.

The phase retardation layer 3 comprises an alignment layer 31 and a thermotropic liquid crystal layer 32 disposed on the light-emitting side of the alignment layer 31, and the cured material layer 5 is disposed on the thermotropic liquid crystal layer 32 opposite to the alignment layer. The alignment layer 31 is made of an alignment material, which can be a heat-curable material such as polyimide, or can be a photoalignment material such as a linear photo polymerization (hereinafter referred as "LPP") alignment material. Preferably, the alignment material is polyimide due to its low price, thereby lowering the production cost. In practical application, the alignment material can be any other materials, which are not specifically enumerated herein.

The thermotropic liquid crystal layer 32 is made of a thermotropic liquid crystal material. The thermotropic liquid crystal material can be any thermotropic liquid crystal material conventionally used in the art. A typical long-rod thermotropic liquid crystal material has the molecular weight of about 200~500 g/mol and the molecular length ratio of about 4~8. The liquid crystal material can be ROF-5184EXP403 (manufactured by Rolic Company), RMS12~014 (manufactured by Merck Company) or HEP964000~030 (manufactured by Jiangsu Hecheng Co., LTD).

The cured material layer 5 is used for protecting the phase retardation layer 3. The curable material can include an UV-curable material or a heat-curable material. In practical application, the curable material can be any other materials, which are not specifically enumerated herein. In this embodiment, the curable material is preferably an UV-curable material such as UV glue, which is also called as photosensitive glue, UV-curable glue or shadowless glue. The UV glue is such glue which can be cured after being irradiated by UV rays. The curing mechanism is that the photoinitiator or photosensitizer in the UV glue absorbs the UV rays under the UV irradiation and then generates active radicals or cations which initiate the polymerization, cross linking or grafting reaction of monomers so as to make the liquid adhesive in the UV glue change into solid adhesive within 2~10 s. The UV wavelength during curing is 200~400 nm and is preferably 365 nm, because when the UV rays having such a wavelength are used for the UV-curing of the UV-curable material, the curing effect is good and the curing time is short. In this embodiment, the UV glue can be such glues as LOCTITE 3492, LOCTITE 3493 or LOCTITE 3494 manufactured by Henkel Company. These glues have superior impact resistance, humidity resistance and sealing property, and have a hardness of 3H or greater, thus realizing the effective protection of the phase retardation layer. From the viewpoint of the price of the material, the cured material layer 5 made from the UV glue can decrease the cost of the material by 30% in comparison with the protection film used in the prior art.

The cured material layer 5 may have a thickness of 20~500 μm. Preferably, the cured material layer 5 may have a thickness of 20~100 μm. When the thickness of the cured material layer 5 is in a range of 20~100 μm, the protection effect can be effectively achieved and further the cost can be saved.

The retardation film provided by this embodiment comprises the phase retardation layer and the cured material layer disposed on the light-emitting side of the phase retardation. Since the cured material layer is formed by curing the curable material applied (for example, coated) on the phase retardation layer, the laminating equipment can be omitted and the equipment investment can thus be decreased, thereby lowering the production cost. From the viewpoint the price of the material, the cured material layer used in this embodiment can decrease the cost of the material in comparison with the protection film used in the prior art.

Figure 3:
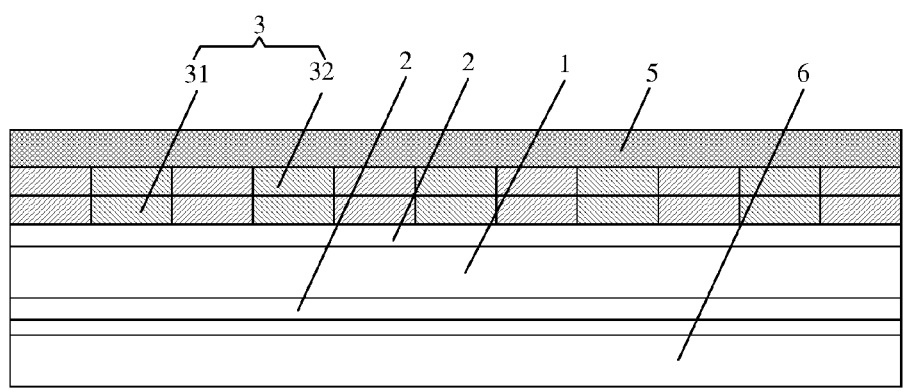
FIG. 3 is a schematic view showing the structure of a display apparatus provided according to the second aspect of the present invention.

FIG. 3 is a schematic view showing the structure of a display apparatus provided according to the second aspect of the present invention. As shown in FIG. 3, the display apparatus comprises a display device and a retardation film disposed on the light-emitting side of the display device, wherein the retardation film can be the retardation film provided according to the first aspect of the present invention, which is not specifically described herein.

In this embodiment, the display device can be a liquid crystal display device, that is, the display device can comprise a liquid crystal display panel 1 and polarizing films 2 formed on the liquid crystal display panel 1, and the retardation film is formed on the polarizing film 2 disposed at the light-emitting side of the liquid crystal display panel 1. The display apparatus further comprises a backlight source 6 at the back side of the display device, which is used for supplying backlight to the display device. The polarizing films 2 are disposed on the both sides of the liquid crystal display panel 1, the retardation film is formed on the polarizing film 2 disposed on the light-emitting side of the liquid crystal display panel 1, and the backlight source 6 is disposed on the other side of the liquid crystal display panel 1.

In practical application, the display device can also optionally be an active matrix/organic light emitting diode (hereinafter referred as AMOLED) display device, that is, the display device can comprise an AMOLED display panel and a polarizing film formed on the light-emitting side of the AMOLED display panel, and the retardation film is formed on the light-emitting side of the polarizing film, wherein the polarizing film is only arranged on the light-emitting side of the AMOLED display panel, and is not to be set on the side opposite to the light-emitting side (not shown in FIG. 3). In practical application, the display device can also be any other types of display device, which are not specifically enumerated herein.

The display apparatus provided in this embodiment comprises the display device and the retardation film, which comprises the phase retardation layer and the cured material layer disposed on the light-emitting side of the phase retardation layer, wherein the cured material layer is formed by curing the curable material applied on the phase retardation layer. Therefore, compared with the prior art, the additional laminating equipment can be omitted in the present invention and the equipment investment can thus be decreased, thereby lowering the production cost. From the viewpoint of the price of the material, the cured material layer used in this embodiment can further effectively decrease the cost of the material in comparison with the protection film used in the prior art.

Figure 4:
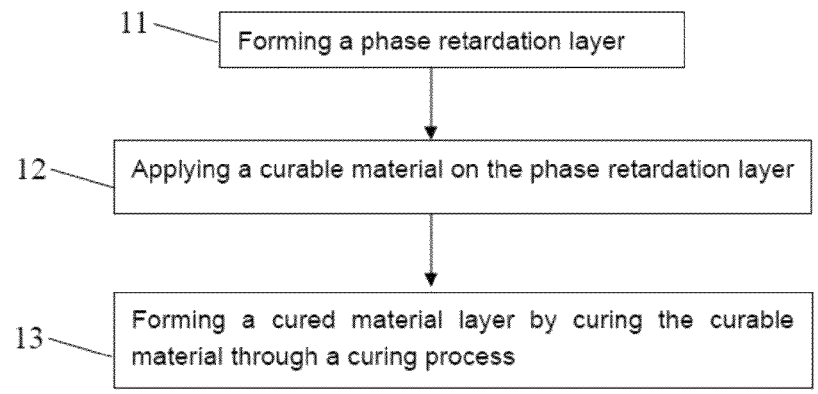
FIG. 4 is a flow chart of a method for producing a retardation film provided according to the third aspect of the present invention.

FIG. 4 is a flow chart of a method for producing a retardation film provided according to the third aspect of the present invention. As shown in FIG. 4, this method comprises:

Step 11: forming a phase retardation layer;

Step 12: applying a curable material on the phase retardation layer; and

Step 13: forming a cured material layer by curing the curable material through a curing process.

These steps will be further described in more details below.

Step 11: Forming a Phase Retardation Layer

As shown in FIG. 2, the phase retardation layer 3 comprises an alignment layer 31 and a thermotropic liquid crystal layer 32, so Step 11 specifically comprises: Step 110—forming an alignment layer and Step 111—forming a thermotropic liquid crystal layer on the alignment layer.

Step 110—Forming an Alignment Layer

Figure 5A:
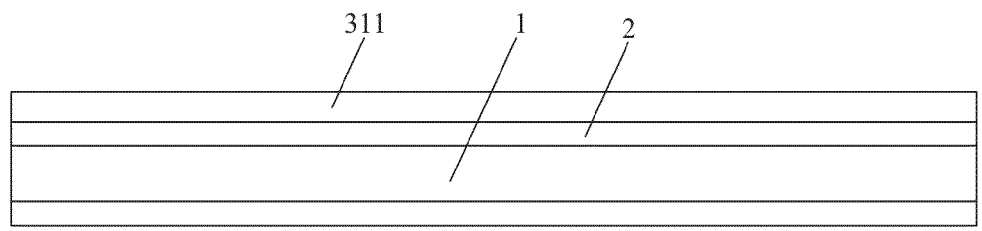
FIG. 5a is a schematic view showing the application of a photoalignment material according to the method of the present invention.
Figure 5B:
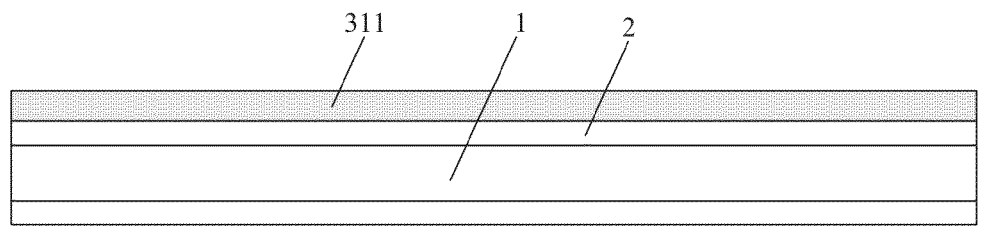
FIG. 5b is a schematic view showing the dry treatment of the photoalignment material according to the method of the present invention.
Figure 5C:
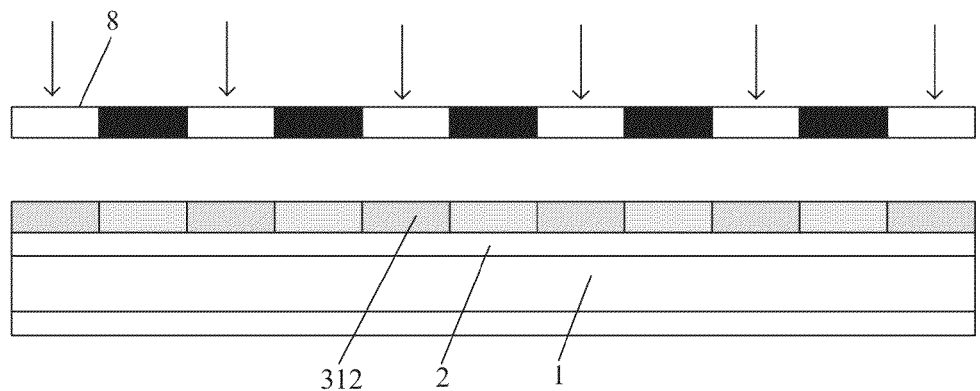
FIG. 5c is a schematic view showing the first exposure of the photoalignment material according to the method of the present invention.
Figure 5D:
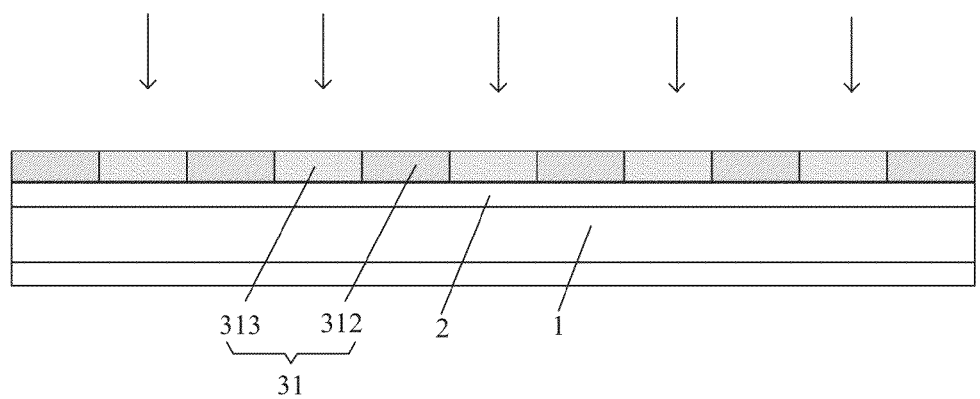
FIG. 5d is a schematic view showing the second exposure of the photoalignment material according to the method of the present invention.

FIG. 5a is a schematic view showing the application of a photoalignment material according to the method of the present invention, FIG. 5b is a schematic view showing the dry treatment of the photoalignment material according to the method of the present invention, FIG. 5c is a schematic view showing the first exposure of the photoalignment material according to the method of the present invention, and FIG. 5d is a schematic view showing the second exposure of the photoalignment material according to the method of the present invention. As shown in FIG. 5a, FIG. 5b, FIG. 5c and FIG. 5d, the alignment layer 31 comprises a first alignment region 312 and a second alignment region 313. Step 110 specifically comprises the following Steps 1101 to 1104.

Step 1101: applying a photoalignment material 311 on the polarizing film 2 disposed on the light-emitting side of the liquid crystal panel 1, as shown in FIG. 5a. Specifically, the photoalignment material can be ROP-255EXP402 (manufactured by Rolic Company) or PAOC-109L (manufactured by JSR Company). It should be noted that the display panel in this embodiment is described by taking the liquid crystal display panel 1 as an example, therefore the polarizing films 2 are formed on both sides of the liquid crystal display panel 1, and the photoalignment material 311 in this step is only applied on the polarizing film 2 disposed on the light-emitting side of the liquid crystal display panel 1. In practical application, the display panel can be any other types of display panel, which are not specifically enumerated herein.

Step 1102: drying the photoalignment material 311, as shown in FIG. 5b.

Step 1103: forming a first alignment region 312 having a first alignment direction by masking the photoalignment material using a masking plate 8 and performing a first UV exposure of the photoalignment material, as shown in FIG. 5c.

Step 1104: forming a second alignment region 313 having a second alignment direction by masking the photoalignment material using the masking plate and performing a second UV exposure of the photoalignment material, as shown in FIG. 5d.

Step 111—Forming a Thermotropic Liquid Crystal Layer on the Alignment Layer

Figure 6A:
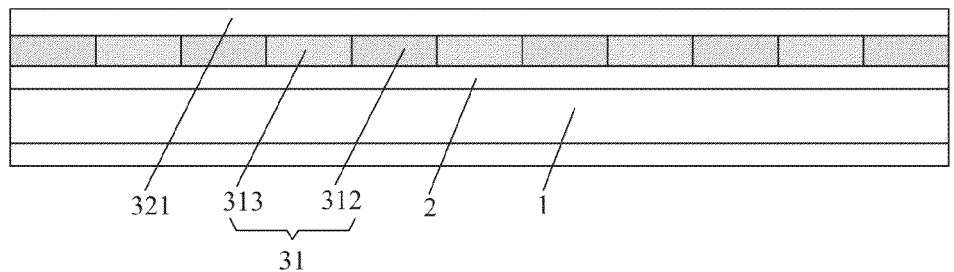
FIG. 6a is a schematic view showing the application of a thermotropic liquid crystal material according to the method of the present invention.
Figure 6B:
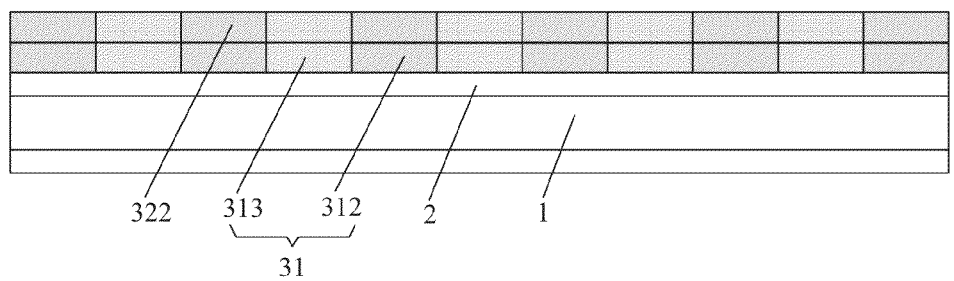
FIG. 6b is a schematic view showing the heat treatment of the thermotropic liquid crystal material according to the method of the present invention.
Figure 6C:
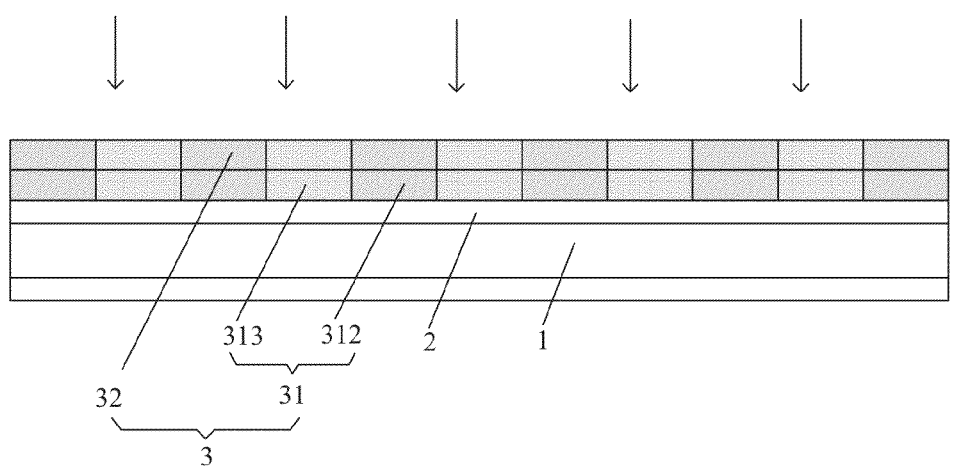
FIG. 6c is a schematic view showing the exposure treatment of the thermotropic liquid crystal material according to the method of the present invention.

FIG. 6a is a schematic view showing the application of a thermotropic liquid crystal material according to the method of the present invention, FIG. 6b is a schematic view showing the heat treatment of the thermotropic liquid crystal material according to the method of the present invention, and FIG. 6c is a schematic view showing the exposure treatment of the thermotropic liquid crystal material according to the method of the present invention. As shown in FIG. 6a, FIG. 6b and FIG. 6c, Step 111 specifically comprises the following Steps 1111 to 1113.

Step 1111: applying a thermotropic liquid crystal material 321 on the alignment layer 31, as shown in FIG. 6a. The thermotropic liquid crystal material can be ROF-5184EXP403 (manufactured by Rolic Company), RMS12~014 (manufactured by Merck Company) or HEP964000~030 (manufactured by Jiangsu Hecheng Co., LTD).

Step 1112: heating the thermotropic liquid crystal material 321, thus forming a heated thermotropic liquid crystal material 322, as shown in FIG. 6b.

Step 1113: UV exposing the heated thermotropic liquid crystal material 322, as shown in FIG. 6c.

Step 12: Forming a Curable Material on the Phase Retardation Layer

Figure 7A:
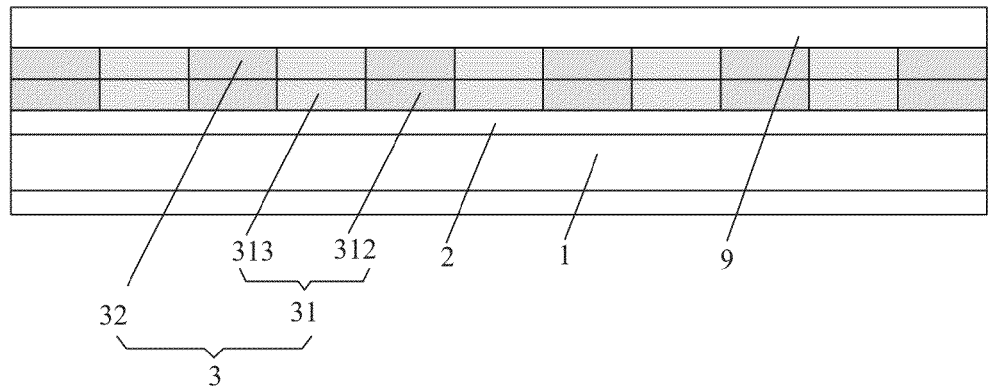
FIG. 7a is a schematic view showing the application of a curable material according to the method of the present invention.

FIG. 7a is a schematic view showing the application of a curable material according to the method of the present invention. As shown in FIG. 7a, Step 12 specifically comprises coating a curable material 9 on the light-emitting side of the phase retardation layer 3 by a spin-coating process, a slit-coating process, a wire-bar coating process or an ink-jet coating process. When the spin-coating process is applied, the rotation speed of the coater is in a range of 1000 rpm to 4000 rpm. When the slit-coating process, the wire-bar coating process or the ink-jet coating process is applied, the dropping amount of the coater is in a range of 1 mg/min to 1 g/min. During the application of the curable material, the thickness and mass of the curable material can be effectively controlled by adopting the rotation speed or dropping amount in the above ranges, thus the waste of the material can be avoided effectively.

In this embodiment, the curable material 9 can comprise an UV-curable material or a heat-curable material. The curable material 9 is preferably an UV-curable material due to the properties such as anti-aging, acid and alkali resistance, scratch resistance, high light transmittance, low haze, zero phase delay and so on thereof. Detailed description for the UV-curable material can be found in the embodiment as described in the first aspect, and need not be repeated herein.

Figure 7B:
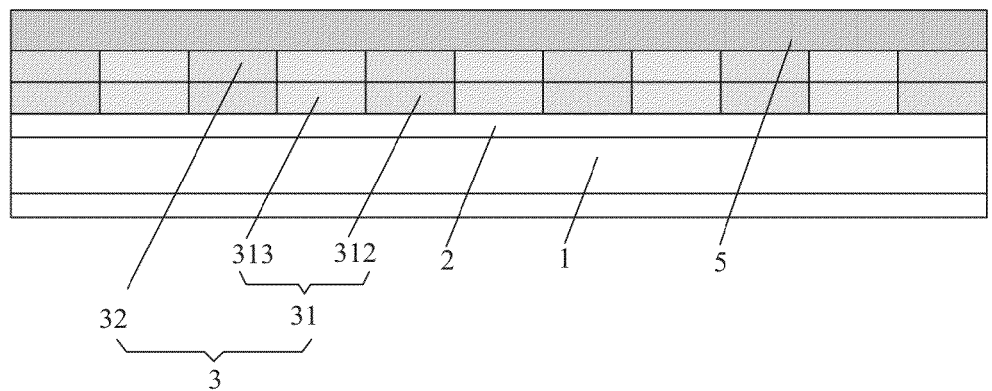
FIG. 7b is a schematic view showing the curing treatment of the curable material according to the method of the present invention.

Step 13: Forming a Cured Material Layer by Curing the Curable Material Through a Curing Process FIG. 7b is a schematic view showing the curing treatment of the curable material according to the method of the present invention. As shown in FIG. 7b, when the curable material comprises the UV-curable material, Step 13 comprises forming a cured material layer 5 by UV-curing the UV-curable material through a UV-curing process. Specifically, the UV-curable material undergoes a UV exposure treatment so as to realize the UV-curing of the UV-curable material. The UV wavelength in the UV-curing process is 200 nm to 400 nm, and is preferably 365 nm. When the UV ray having the above wavelength is used for the UV-curing of the UV-curable material, the curing effect is good and the curing time is short. Preferably, the irradiation time of the UV-curing process is 2 s to 10 s.

The cured material layer 5 can have a thickness of 20~500 μm. Preferably, the cured material layer 5 has a thickness of 20~100 μm. When the thickness of the cured material layer 5 is in a range of 20~100 μm, the protection effect can be effectively achieved and further the cost can be saved.

Optionally, in practical application, when the curable material comprises a heat-curable material, Step 13 can comprise forming the cured material layer by heat-curing the heat-curable material through a heat-curing process.

The method for producing a retardation film as provided in this embodiment comprises: forming a phase retardation layer, applying a curable material on the phase retardation layer, and forming a cured material layer by curing the curable material through a curing process. From the viewpoint of the equipment, the additional laminating equipment can be omitted in the method of the present invention and the equipment investment can thus be decreased, thereby lowering the production cost in comparison with the laminating technique used in the prior art. From the viewpoint the price of the material, the cured material layer used in this embodiment can effectively decrease the cost of the material in comparison with the protection film used in the prior art.

EXAMPLES

Examples 1~4

The retardation films of Examples 1~4 were obtained according to the following method using the photoalignment materials, the thermotropic liquid crystal materials and the curable materials listed in Table 1. An alignment layer and a thermotropic layer were formed firstly on a substrate. Then a curable material was coated on the phase retardation layer by a spin-coating equipment IDLLUV05-P3 (manufactured by Rolic Company) under the process conditions with rotation speed of 1000~3,000 rpm and rotation time of 2~60 s. A cured material layer was finally prepared from photo-curing or heat-curing depending on the specific curable materials. The alignment layer and the thermotropic layer were prepared according to the conventional methods in the art.

The hardness of each retardation film obtained in Examples 1~4 were tested using a pencil hardness tester (manufactured by Suzhou Jinge Test Equipment Co., LTD) in accordance with the hardness testing standard GB/T 6739-2006, and the light transmittance of each retardation film obtained in Examples 1~4 were tested by BOE Technology Group Technology Center Optical Test Station in accordance with the light transmittance testing standard GB/T 18910. These results are shown in Table I.

Comparative Examples 1~2

The retardation films of Comparative Examples 1~2 were prepared in the same manner as those of Examples 1~4, except that the protection films disposed at the outermost of the phase retardation layers in the retardation films were a PET film and a TAC film which were laminated onto the phase retardation layers by a laminating equipment. The properties of each retardation film of Comparative Examples 1~2 were tested in the same manner as those in Examples 1~4, and the test results thereof are shown in Table 1.

TABLE 1

|  | curable material (wavelength/ temperature, curing duration) | phase retardation layer | | hardness | light transmittance |
|---|---|---|---|---|---|
|  |  | alignment material | thermotropic liquid crystal material |  |  |
| Example 1 | LOCTITE 3492 from Henkel Company (365 nm, 5 s) | ROP-255 EXP 402 from Rolic Company | ROF-5184 EXP 403 from Rolic Company | 2H | 96% |
| Example 2 | LOCTITE 3494 from Henkel Company (365 nm, 8 s) | PAOC-109L from JSR Company | RMS12-014 from Merck Company | 2H | 95% |
| Example 3 | op2131D from Momentive Company (80° C., 30 min) | ROP-255 EXP 402 from Rolic Company | ROF-5184 EXP 403 from Rolic Company | 2H | 94% |
| Example 4 | DBA2420 from Dupont Company (80° C., 30 min) | PAOC-109L from JSR Company | RMS12-014 from Merck Company | 2H | 93% |
| Comparative Example 1 | PET | FPR-42 inch FHD from LGC Company | | 1H | 85% |
| Comparative Example 2 | TAC | FPR-55 inch FHD from LGC Company | | 2H | 90% |

From the test results shown in Table 1, it can be seen that the retardation films of the present invention have similar or improved hardness and light transmittance compared with the retardation films in which the PET/TAC protection films were formed by laminating in prior art, and the retardation films prepared by the method of the present invention can be obtained without using additional laminating equipment, thus lowering the production cost.

It should be understood that the embodiments described above are merely the exemplary embodiments for the purpose of illustrating the principles of the present invention, which shall not limit the scope of the invention. Various changes and modifications to the present invention made without departing from the scope and spirit of invention by a person skilled in the art should all be covered in the protection scope of the present invention.

The invention claimed is:

1. A retardation film, comprising a phase retardation layer and a cured material layer formed by curing a curable material, wherein the phase retardation layer comprises an alignment layer and a liquid crystal layer disposed on the alignment layer, and the cured material layer is disposed on the liquid crystal layer opposite to the alignment layer and has a thickness in a range of 20 μm to 500 μm.

2. The retardation film according to claim 1, characterized in that the curable material comprises an UV-curable material or a heat-curable material.

3. The retardation film according to claim 1, characterized in that the thickness of the cured material layer is in a range of 20 μm to 100 μm.

4. A display apparatus, comprising a display device and a retardation film disposed on the light-emitting side of the display device, wherein the retardation film comprises a phase retardation layer and a cured material layer formed by curing a curable material, wherein the phase retardation layer comprises an alignment layer and a liquid crystal layer disposed on the alignment layer, and the cured material layer is disposed on the liquid crystal layer opposite to the alignment layer and has a thickness in a range of 20 μm to 500 μm.

5. The method for producing a retardation film according to claim 4, characterized in that the thickness of the cured material layer is in a range of 20 μm to 100 μm.

6. A method for producing a retardation film, comprising:
forming a phase retardation layer comprising an alignment layer and a liquid crystal layer disposed on the alignment layer;
applying a curable material on the liquid crystal layer opposite to the alignment layer; and
forming a cured material layer by curing the curable material using a curing process, wherein the cured material layer has a thickness in a range of 20 μm to 500 μm.

7. The method for producing a retardation film according to claim 6, characterized in that the curable material is applied on the liquid crystal layer by a spin-coating process, a slit-coating process, a wire-bar coating process or an ink-jet coating process.

8. The method for producing a retardation film according to claim 6, characterized in that the curable material comprises an UV-curable material.

9. The method for producing a retardation film according to claim 8, characterized in that the UV-curable material is UV-cured by a UV-curing process.

10. The method for producing a retardation film according to claim 9, characterized in that the UV wavelength in the UV-curing process is in a range of 200 nm to 400 nm.

11. The method for producing a retardation film according to claim 10, characterized in that the UV wavelength in the UV-curing process is 365 nm.

12. The method for producing a retardation film according to claim 9, characterized in that the UV irradiation time in the UV-curing process is in a range of 2 s to 10 s.

13. The method for producing a retardation film according to claim 6, characterized in that the curable material comprises a heat-curable material.

14. The method for producing a retardation film according to claim 13, characterized in that the heat-curable material is heat-cured by a heat-curing process.

* * * * *